United States Patent [19]

Jones

[11] 4,373,811
[45] Feb. 15, 1983

[54] SCOPE FOR VIEWING THE INTERNAL SURFACE OF A BORE OR SIMILAR CAVITY

[76] Inventor: Ira D. Jones, 1023 S. Main St., South Bend, Ind. 46601

[21] Appl. No.: 190,998

[22] Filed: Sep. 26, 1980

[51] Int. Cl.³ ............................................... G02B 23/02
[52] U.S. Cl. ..................................... 356/241; 350/506
[58] Field of Search ........................... 356/241; 350/11

[56] References Cited

U.S. PATENT DOCUMENTS 3,481,660 12/1969 Sheldon .......................... 356/241 X
3,924,608 12/1975 Mitsui .............................. 356/241 X

FOREIGN PATENT DOCUMENTS 570022 6/1945 United Kingdom ................ 356/241

Primary Examiner—John K. Corbin
Assistant Examiner—Matthew W. Koren
Attorney, Agent, or Firm—James D. Hall

[57] ABSTRACT

A scope which is for viewing a selected portion of the internal surface of a bore or similar cavity and which includes a viewer of optically clear light transmitting material and a housing. The viewer is encased within a longitudinal bore of the housing with its viewing end adjacent the upper end face of the housing and its image transmitting end aligned with a transverse bore of the housing so that the image of a selected portion of the cavity surface is exposed to the image transmitting end, thereby permitting visual observation of a selected portion of the internal surface of a cavity when the housing is placed within the cavity.

3 Claims, 6 Drawing Figures

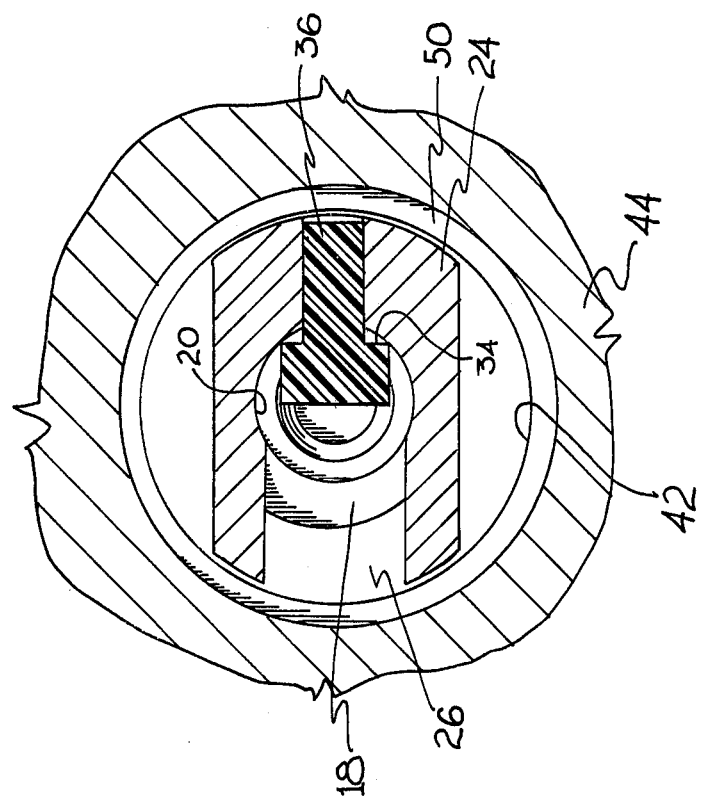
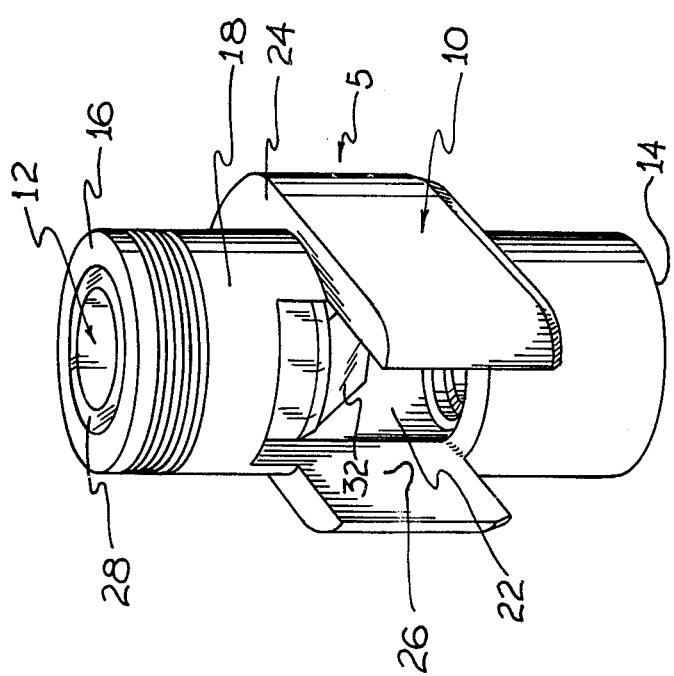

SCOPE FOR VIEWING THE INTERNAL SURFACE OF A BORE OR SIMILAR CAVITY

SUMMARY OF THE INVENTION

This invention relates to a scope for viewing the internal surface of a cavity and will have more specific application for the visual verification of the distance between a reference point and a point on the surface of a bore formed by the wall of a work member.

The surface of a bore within a work piece may include a groove, recess, shoulder, counterbore, or similar machined shape. The scope of this invention includes a housing and a viewer. The housing has a longitudinal bore which is defined by a wall and which extends from the upper end of the wall. The housing has a second bore which extends through the housing wall in a transverse relationship to the longitudinal bore therein and which is spaced from the lower end of the housing wall at a predetermined or selected distance.

The viewer includes an image transmitting end and a viewing end. The viewing end fits within the longitudinal bore of the housing. The image transmitting end is aligned with the tranverse bore of the housing and includes means for directing image producing light from the viewing end through the housing transverse bore, onto the surface of the bore of the work member being examined, and reflecting an image of the surface to the viewing end.

The scope is utilized by inserting the housing into the cavity of the work member. The lower end of the housing rests upon a reference point which may be a work surface common to the lower end of the housing and the work piece or a shoulder within the cavity. With the housing in place, a selected object within the cavity or a selected portion of the cavity may be viewed at the viewing end of the scope. In this manner, the dimension between the selected object within the cavity and the reference point can be verified.

Accordingly, it is an object of this invention to provide an improved scope for viewing the internal surface of a bore or a similar cavity in which the location of an internal object within the cavity, such as a groove, recess, shoulder, counter-bore or counter-sink, can be accurately verified.

Still another object of this invention is to provide an economical scope for comparatively determining the location of grooves, recesses, shoulders, counterbores, counter-sinks, and similar surface objects within a bore or similar cavity.

And still another object of this invention is to provide a scope for verifying the location of a line object within a bore or similar cavity at the internal surface thereof.

Other objects of this invention will become apparent upon a reading of the following description.

BRIEF DESCRIPTION OF THE DRAWINGS

FIG. 4 is a perspective view of the scope of FIG. 1 as seen from the opposite side.

FIG. 5 is a sectional view taken along line 5—5 of FIG. 2.

DESCRIPTION OF THE PREFERRED EMBODIMENT

Figure 2:
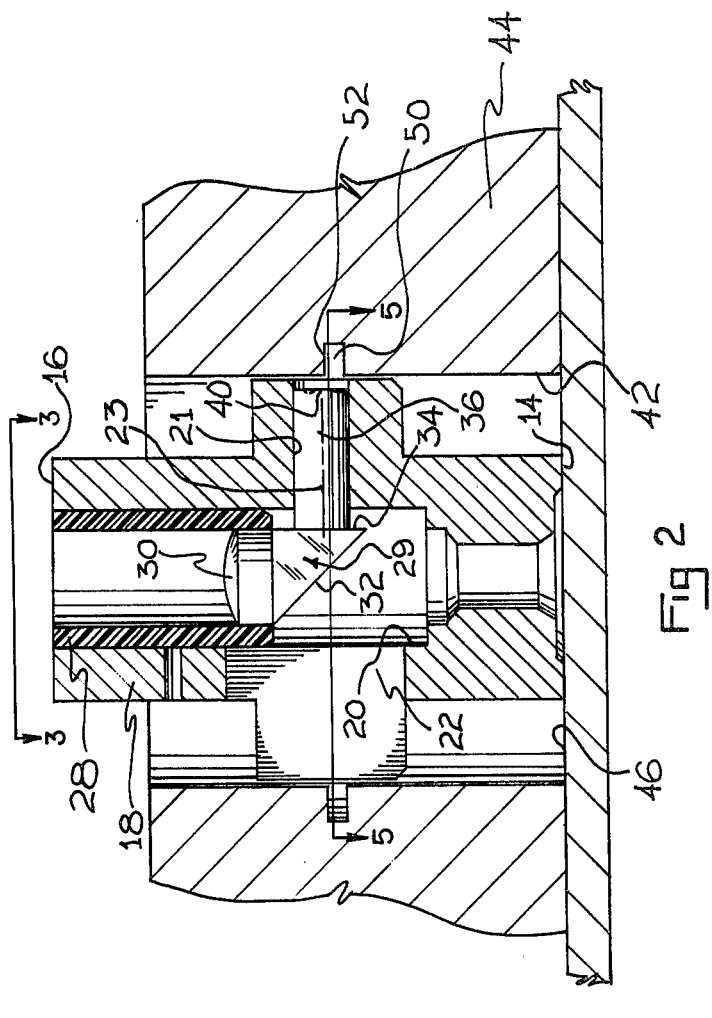
FIG. 2 is a sectionalized elevational view of the scope of FIG. 1 shown inserted into a bore of a work piece.

The preferred embodiment illustrated is not intended to be exhaustive or to limit the invention to the precise form disclosed. It is chosen and described in order to best explain the principles of this invention and its application and practical use to thereby enable others skilled in the art to best utilize the invention.

The scope 5 illustrated in FIGS. 1–5 includes a housing 10 and a viewer 12. The housing 10 is of a generally cylindrical shape with a lower end face 14, an upper end face 16, and a side wall 18. Side wall 18 forms a longitudinal bore 20. Intermediate the upper and lower end faces 14, 16 is formed an opening 22 in side wall 18. A collar 24 is formed around the side wall 18 and has a slot 26 which is aligned with opening 22. A transverse bore 21 is formed opposite opening 22 through side wall 18 and collar 24 and is a specific distance from a housing reference surface such as lower end face 14.

Viewer 12 is formed of optically clear material, such as an acrylic resin and includes a viewing end composed of sleeve 28 and an image transmitting end 29. Sleeve 28 extends to housing upper end face 16. Image transmitting end 29 includes a lens 30, an optical surface 32 angled 45° with respect to the axis of longitudinal bore 20, another optical surface 34 which parallels the axis of bore 20 and a light transmitting rod 36 which extends from optical surface 34. Rod 36 has circular gauging indicators 38 in its end face 40. The structure and function of circular indicators 38 is fully described in U.S. Pat. No. 4,135,824.

Viewer 12 is fitted within housing 10 as follows. Image transmitting end 29 is fitted through slot 26 and opening 22 into longitudinal bore 20 with rod 36 extending into bore 21 along an axis 23. Sleeve 28 is then inserted into longitudinal bore 20 at its upper end 16. The lower end of sleeve 28 is press fit about lens 30 to anchor transmitting end 29 of the viewer within housing 10.

Figure 6:
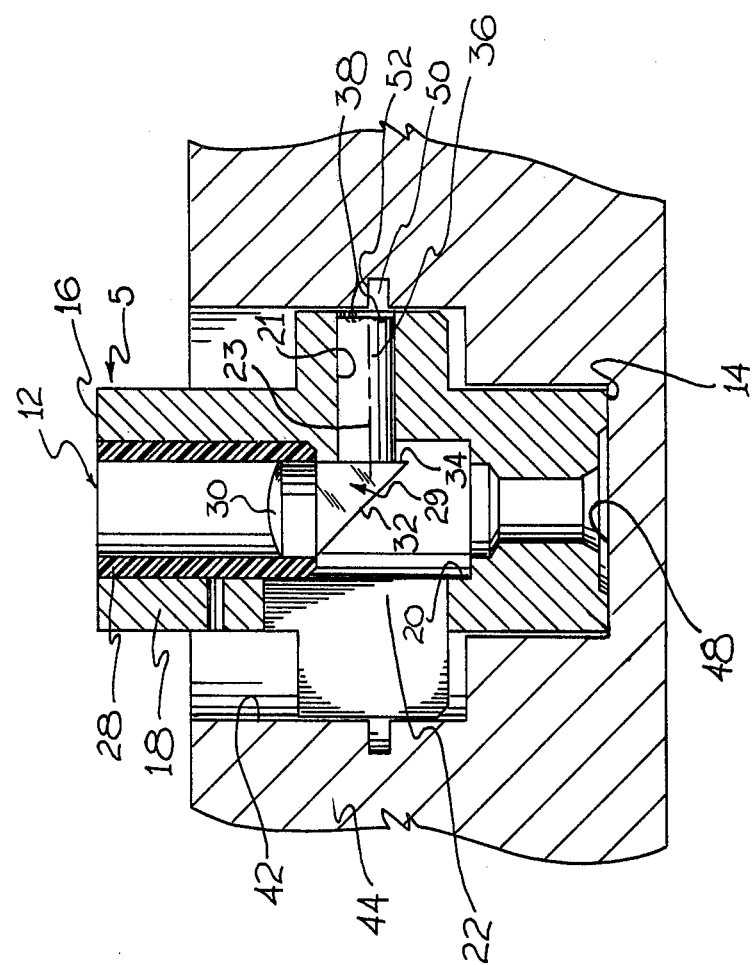
FIG. 6 is a sectionalized elevational view of the scope of FIG. 1 shown resting on an internal surface of a work piece bore.

Scope 5 is utilized by setting housing 10 in the bore 42 of work piece 44 so that lower end face 14 rests on a reference point. The reference point may be a work surface 46 common to lower end face 14 and the bottom of work piece 44, as illustrated in FIG. 2, or it may be a shoulder 48 within bore 42, as illustrated in FIG. 6. Another application possible is where the reference point is a known distance from the surface on which lower end face 14 rests.

Figure 3:
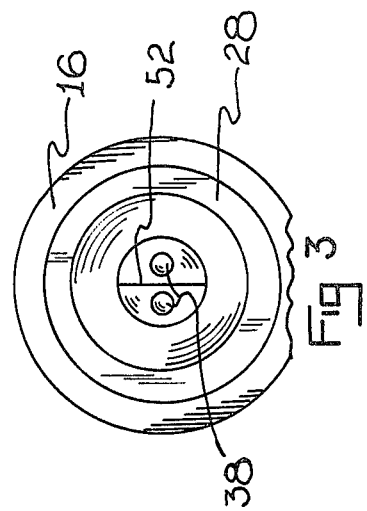
FIG. 3 is a top plan view as seen from line 3—3 of FIG. 2.
Figure 1:
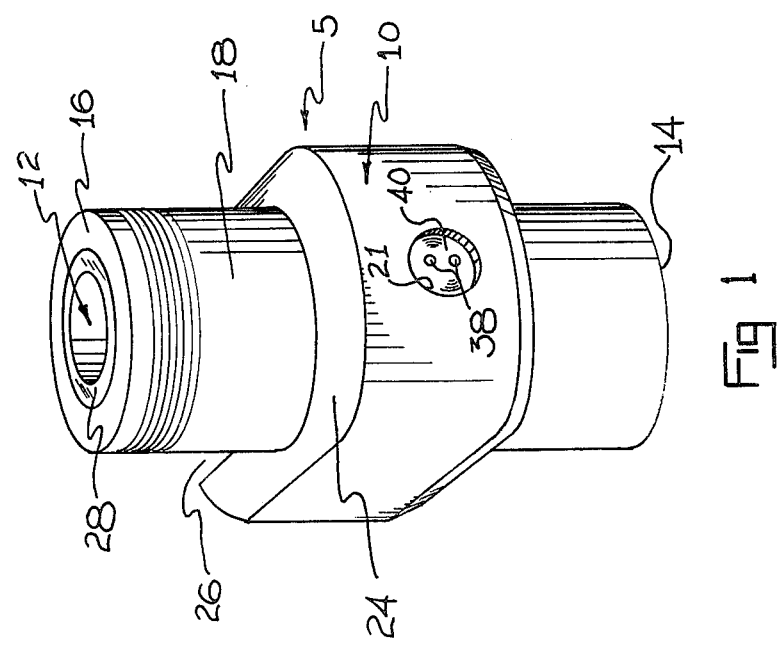
FIG. 1 is a perspective view of the scope of this invention.

When lower end face 14 is in a known relationship to the reference point, circular indicators 38 of viewer 12 are located at a selected distance from the reference point and the spacing between the indicators can be utilized as a tolerance within which a particular edge 52 of groove 50 within bore 42 must be located to be within the tolerance for work piece 44. In FIG. 3, groove 50 is shown as viewed from the image viewing end 29 of viewer 12 with the upper edge 52 of the groove seen as extending midway between the peripheral edges of indicators 38, indicating that such edge of groove 50 is within tolerance.

When housing 10 is formed of the same material as the work piece, the selected distance between the spaced indicators 38 of viewer 12 and lower end face 14 of the housing remains constant and any error due to differing coefficients of expansion of the metal work piece and the acrylic viewer 12 is eliminated.

The scope of this invention may also be constructed with several viewers. To accommodate this construction, housing 10 would have several eccentric longitudinal bores with corresponding transverse bores at differently spaced intervals from a reference surface of the housing. With this construction, the scope could be used to verify several distances within the same work piece cavity or within different cavities of similar shape.

It should be noted that the housing reference surface may be some other surface than lower end face 14. The reference surface may be an intermediate shoulder or some other surface of the housing in a selected position relative to the viewer axis 23.

It is to be understood that the invention is not to be limited to the details above given, but may be modified within the scope of the appended claims.

What I claim is:

1. A scope for viewing a machined shape on the surface of a bore or a similar cavity formed in a work member having a well defining said cavity, said scope comprising a housing including a side wall, said side wall defining a longitudinal bore therein, said side wall terminating in an upper end face and a lower end face, said longitudinal bore intersecting said upper end face, a transverse bore extending laterally from said longitudinal bore through said side wall, said transverse bore spaced from said lower end face, a viewer including a viewing end and an image transmitting end, said image transmitting end including means for directing image producing light transversely of said viewing end along a transverse axis and reflecting an image of said shape produced by said light to said viewing end, said viewer fitting within said housing with said viewing end being received in said longitudinal housing bore and said light directing means being aligned with said transverse bore, said viewer image transmitting end including an extending light transmitting rod, said rod projecting into said housing transverse bore when said viewer is fitted within said housing, said rod for transmitting said image producing light from said light directing means along said image transmitting end axis toward said cavity shape and an image of said shape to said light directing means for reflection to said viewer viewing end, said housing including a reference surface selectively spaced from said image transmitting end axis and being adapted to fit into said work member cavity with said transverse bore being aligned with said shape when said housing reference surface abuts a specified reference point.

2. The scope of claim 1 wherein said rod has an end face, said rod end face adjacent the outer surface of said housing side wall and spaced from said housing reference surface.

3. The scope of claim 1 wherein said rod has spaced indicia on said rod end face, said one indicator being spaced from said other indicator along a diretion paralleling the longitudinal bore of said housing, said space between said indicia being selectively determined whereby said cavity shape will be viewable between said indicia through said viewer viewing end when said housing is inserted into said work member cavity with said housing reference surface thereof abutting said specified reference point and the cavity shape is the proper distance from the specified reference point.

* * * * *